W. H. WHITMAN.
Potato and Seed-Planter.

No. 163,711.  Patented May 25, 1875.

WITNESSES:
Chas. Nida
Sedgwick

INVENTOR:
W. H. Whitman
BY
ATTORNEYS.

THE GRAPHIC CO. PHOTO-LITH. 39 & 41 PARK PLACE, N.Y.

UNITED STATES PATENT OFFICE.

WILLIAM H. WHITMAN, OF SCRANTON, PENNSYLVANIA.

IMPROVEMENT IN POTATO AND SEED PLANTERS.

Specification forming part of Letters Patent No. 163,711, dated May 25, 1875; application filed March 13, 1875.

*To all whom it may concern:*

Figure 1:
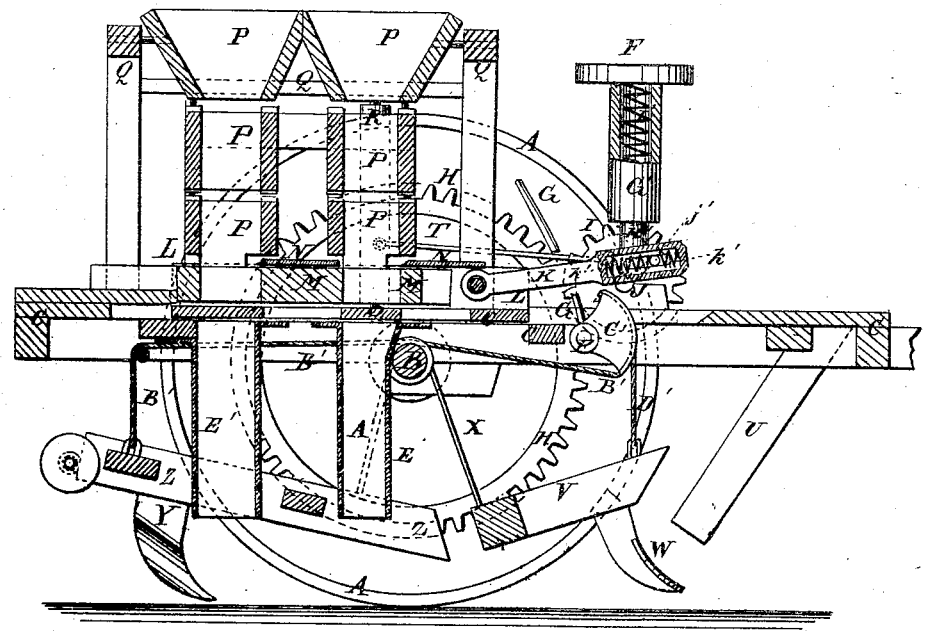
Figure 2:
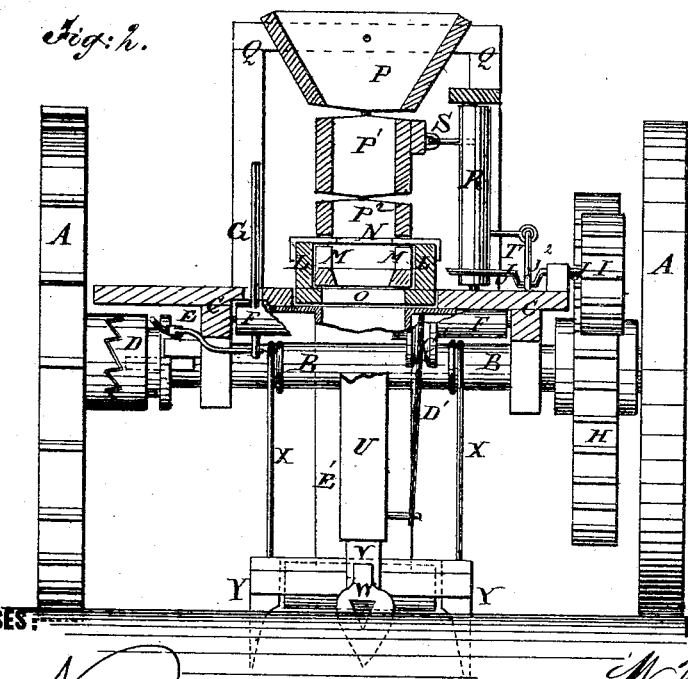

Be it known that I, WILLIAM H. WHITMAN, of Scranton, in the county of Luzerne and State of Pennsylvania, have invented a new and useful Improvement in Potato and Seed Planter, of which the following is a specification:

Figure 1 is a vertical longitudinal section of my improved planter. Fig. 2 is a front view of the same, partly in vertical cross-section, and part being broken away to show the construction.

Similar letters of reference indicate corresponding parts.

The invention will first be fully described, and then pointed out in the claims.

A are the wheels, which revolve upon the journals of the axle B. The axle B revolves in bearings attached to the frame or platform C. One or both of the wheels A have teeth formed upon the inner ends of their hubs to take hold of the sliding clutch D, placed upon the axle B, so that the said wheels may be made to carry the said axle with them in their revolution, when desired. The clutch D is moved into and out of gear by the bent lever E, the end of which rests in a ring-groove in the clutch D. The lever E is pivoted at its angle to the frame C, or to a support attached to said frame, and its other end projects along the transverse shaft F, with which it is connected by a keeper or stop-pins, so that the clutch may be shifted by operating the said shaft F. The shaft F works in bearings attached to the frame C, and to it is attached a lever, G, which projects through a slot in the frame or platform C into such a position that it can be conveniently reached and operated by the driver from his seat. To the axle B is attached a large gear-wheel, H, the teeth of which mesh into the teeth of the small gear-wheel I. The gear-wheel I is attached to the outer end of the short shaft J, that revolves in bearings attached to the frame or platform C. Upon the inner end of the shaft J, at or near the central line of the machine, is formed a crank, $j^1$, which works in a slot in the forward end of the pitman K. In the slot of the pitman K are placed springs $k'$, which rest against the crank $j'$, and the effect of which is to cause the pitman to stand still for a little time at the end of each movement. The other end of the pitman K is pivoted to the end of a frame, L, which slides upon a block or frame, M, in which is formed a hole or pocket of sufficient size to receive enough seed for a hill, and which is placed directly beneath the hopper. To the upper side of the sliding frame L is attached a plate, N, and to the lower side of said sliding frame L is attached a plate, O. The plates N O are so arranged that as the frame L moves forward the plate N will uncover the upper end of the pocket M to allow the seed to drop into said pocket. As the frame L moves to the rearward, the plate N will cover the upper end of said pocket, and the plate O will uncover its lower end, allowing the seed to drop to the ground. The plate N is made with a short edge, so that when the machine is used for planting potatoes it may cut off a piece of potato large enough for a hill. In the case of large potatoes, they will be cut more than once, and small potatoes will not be cut at all. When the machine is used for planting seeds the upper plate serves simply as a cut-off. The hopper is made in three parts, P $P^1$ $P^2$, the lower part being stationary, attached to the block or frame M, and having an opening in its lower part for the passage of the plate N. The adjacent edges of the three parts are rounded off or beveled, as shown in Fig. 2, so that the two upper parts may rock upon each other, and upon the stationary lower part. The three parts of the hopper are kept in place upon each other by dowel-pins. The upper part of the hopper is made flaring, and is pivoted to the frame Q, which is rigidly attached to the frame C. R is an upright shaft, which is pivoted to the frame C Q at the side of the hopper P, and to which is attached an arm which is connected with the middle part of the jointed hopper P by a short connecting-rod, S. To the lower part of the upright shaft R is attached another arm, to which is pivoted the end of a connecting-rod, T, which is pivoted to a crank, $j^2$, formed upon the shaft J, so that the parts of the hopper P may be rocked upon each other to keep the seed from clogging by the advance of the machine. U is a downwardly-projecting and rearwardly-inclined arm, the upper end of which is rigidly attached to the forward part of the frame C, to receive the beveled forward end of the beam V of the opening-plow W, to sustain the downward draft upon said plow-beam. The rear end of the plow-beam V is supported by two rods, X, the upper ends of which are hung upon the axle B. Y are the covering-plows, which are attached to the side bars of the frame Z. The forward end of the frame Z is supported by two rods, A', the upper ends of which are hung upon the axle B. B' is a cord, one end of which is attached to the rear end of the frame Z of the covering-plows Y. The cord B' passes over guide pulleys or rollers pivoted to the frame C, and its other end is attached to the segmental pulley C', attached to the shaft F. D' is a cord attached to the forward end of the beam V of the opening-plow W. The other end of the cord D' is attached to the segmental pulley C'.

By this construction the movement of the lever G to throw the gear-wheels H I into and out of gear, will lower the opening and covering plows into, and raise them out of, working position. E' are the conductor-spouts, by which the seed is conducted from the dropping-device into the furrow opened by the plow W. F' is the driver's seat, which is attached to the upper end of a tube, G', which is placed upon the upper end of a cylindrical standard, H', the lower end of which is attached to the frame or platform C. I' is a coiled spring placed in the upper part of the tube G', and which rests upon the upper end of the standard H', to give elasticity to the seat.

One or more hoppers, P, and pairs of dropping-plates N O, may be used in connection with the sliding frame L, if desired.

Having thus described my invention, I claim as new and desire to secure by Letters Patent—

1. In a seed-planter, a hopper made in three parts, P P$^1$ P$^2$, the middle one forming a vibratory throat, as and for the purpose set forth.

2. The combination, with the seed-slide and driving-crank, of an intermediate pitman, K, provided with springs k' that cause it to stand still for a brief time at the end of each throw, as and for the purpose specified.

3. The combination of the shaft R and its arms and connecting-rods S T, with the frame Q, the pivoted jointed hopper P, and the crank j$^2$ formed upon the shaft J, that gives motion to the pitman K, of the dropping-slide L, substantially as herein shown and described.

WILLIAM H. WHITMAN.

Witnesses:
JEREMIAH WILLIAMS,
ISAAC DEPPEN.